Oct. 5, 1926.

W. H. TAYLOR 1,601,837

TIRE CARRIER FOR MOTOR VEHICLES

Filed Nov. 30, 1923

Inventor
William H. Taylor
By his Attorneys

Patented Oct. 5, 1926.

1,601,837

UNITED STATES PATENT OFFICE.

WILLIAM H. TAYLOR, OF LANSING, MICHIGAN.

TIRE CARRIER FOR MOTOR VEHICLES.

Application filed November 30, 1923. Serial No. 677,722.

My invention relates to tire carriers designed for use with motor driven vehicles to support a spare demountable wheel rim, with a tire thereupon; and particularly to tire carriers of the type or class comprising a supporting structure designed and adapted to fit inside the rim to be supported, and having means for holding the rim in place upon and for permitting its ready and convenient removal from such internally arranged supporting structure.

More particularly stated, my invention contemplates and the object thereof is to provide a tire carrier of the class referred to having an improved supporting structure adapted to fit inside of and to support a demountable rim as aforesaid, said structure including as its principal element an integral or single piece member formed from a sheet metal blank of proper size and contour bent and shaped so as to provide, in connection with a suitable cross bar, a substantially triangular frame having particular features of construction hereinafter enumerated, and finally claimed; together with suitable means for supporting said triangular frame, ordinarily at the rear end of a vehicle body and frame; the carrier as a whole being simple in form and one which may be manufactured entirely from sheet or thin plate stock and at much less cost than heretofore, and one which is extremely strong and rigid considering the amount of material entering into and forming the same; the arrangement of the parts which make up the carrier and of the material of the several parts and elements being such as to secure maximum strength with minimum weight of material; all as will hereinafter and at length more fully appear.

With the above and other objects in view my invention consists in the improved tire carrier illustrated in the accompanying drawing and hereinafter described and explained; and in such variations and modifications thereof, within the scope of the concluding claims, as will be obvious to those skilled in the art to which my invention relates.

In the drawing accompanying and forming a part of this specification, and wherein the preferred embodiment of my invention is illustrated:—

Figure 1:
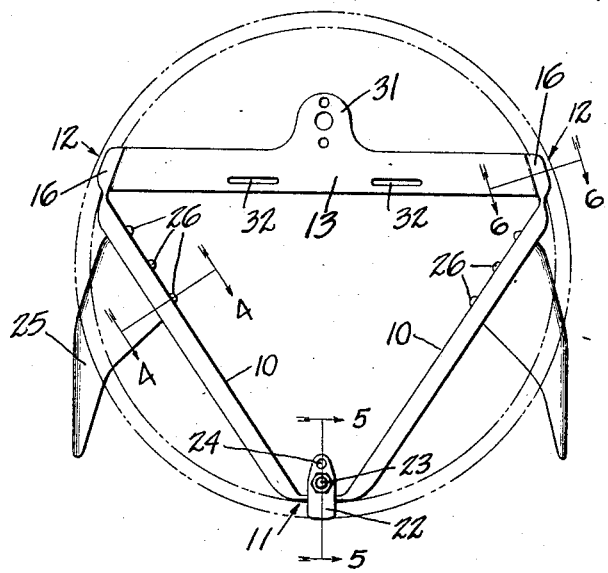
Figure 1 is a view showing my improved tire carrier in elevation and, in the most usual disposition and use thereof, as seen from a position to the rear of a motor driven vehicle equipped therewith.
Figure 2:
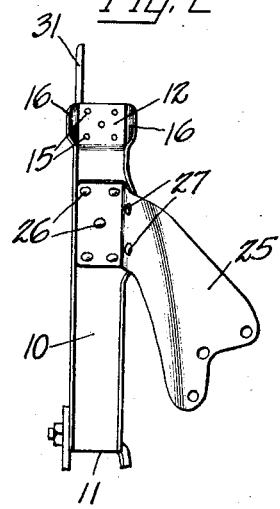
Figure 2 is a view showing my improved tire carrier in side elevation.

Referring now to the drawing, my improved tire carrier comprises a main triangular frame of such dimensions as to fit within a demountable rim to be carried, said frame being made up of two oppositely arranged side members 10, 10 converging toward one another and merging at a lower apex of the frame where they provide a bottom seat 11 which is preferably of some little length, circumferentially of the frame, and lies in a substantially horizontal position; said side members being preferably channel shaped in cross section to thereby secure increased strength and stiffness for a given weight of metal.

The upper ends of the side members are inclined inwardly to form two top seats 12, 12 at the upper apices of the triangular frame; and said frame is completed by a top cross bar 13 connecting the upper ends of the side members of the frame with one another. This cross member is shown as in the form of a plate arranged edgewise in the triangular frame structure, that is its face which determines its width is arranged substantially parallel with a plane extending along the two side members 10, 10. The ends of this cross bar are bent at right angles to the length thereof, and along inclined lines upon the face aforesaid, so that said ends which are designated by the reference numeral 14 (one only appearing) will contact with the inclined top seats 12, 12 throughout the areas or the greater parts thereof of the said seats. Then the said ends are fastened to the seats by rivets 15 or equivalent fastening means to thereby provide a unitary and rigid triangular frame structure.

Associated with the top seats 12, 12 are pairs of side lugs 16, 16 which provide means for preventing sidewise movement of a demountable rim supported by the carrier and resting upon said seats between said lugs, sidewise movement being regarded as movement perpendicular to a plane parallel with the sides 10, 10 of the triangular frame; and like movement relative to the bottom seat 11 is prevented by a similar lug 17 which is itself backed up and strengthened by a lug 18 of a bracket 19 secured to said bottom seat by rivets 20 or their equivalent. This bracket has an upwardly extending portion 21 to which a separate holding member 22 is fastened by a bolt 23. When this holding member is in the upright position in which it is illustrated its lower end acts, in conjunction with the lugs 17, 18, to prevent sidewise movement of a rim supported by the carrier; but when the bolt 23 is loosened and the member 22 swung into a horizontal position, then the lower portion of a detachable rim supported by the carrier may be swung free from the seat 11 and the rim lifted to clear the lugs 16 of the top seats 12, and the rim thus removed from the carrier. The upwardly extending arm 21 and the latch 22 are provided with registering holes 24 through which the hasp of a padlock may be passed to thereby prevent unauthorized removal of the rim from the carrier.

The triangular frame aforesaid is supported from the rear end or other part of a vehicle equipped with my improved tire carrier by means of arms 25, 25 the ends of which are fastened to the side members of the frame by rivets or equivalent fastening means. Said sides as above appears are preferably made channel shaped in cross section, as shown, in which case the ends of the arms are bent so as to fit within the channels, and are fastened to the sides by rivets 26 passing through the bottom wall of the channel, and by additional rivets 27 extending through a side wall of the channel if extra rivets are thought to be necessary.

Figure 3:
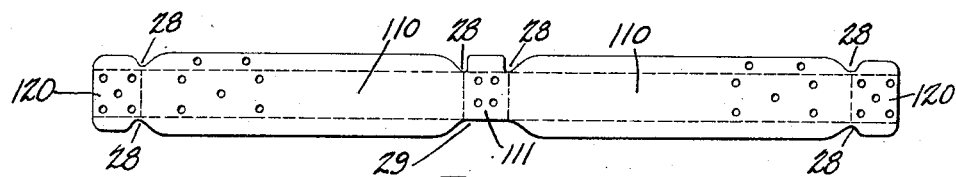
Figure 3 is a view showing a sheet metal or thin plate blank from which the principal element or part of the carrier is formed by suitable bending and shaping operations performed thereupon.
Figures 4, 5:
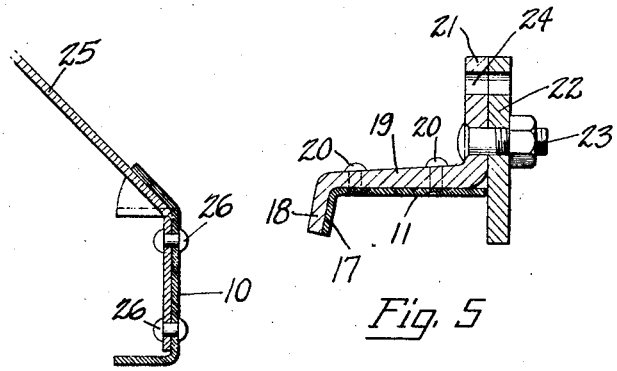
Figure 4 is a view showing a section upon a transverse plane indicated by the line 4, 4, Figure 1.
Figure 5 is a similar view upon a plane indicated by the line 5, 5, Figure 1.
Figure 6:
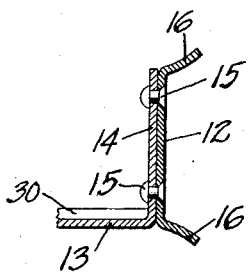
Figure 6 is another sectional view taken upon a plane indicated by the line 6, 6, Figure 1.

The side members 10, 10, the seats 11, 12, and the lugs aforesaid are all formed from a single sheet metal or thin plate blank by bending and shaping the same in the way necessary to form said members by the use of any machine, device or appliance suitable to that end. Such a blank is shown in Figure 3 wherein the numeral 111 designates the part or section whereby the bottom seat 11 is provided; 110, 110 designate sections which form the sides 10, 10 of the triangular frame; and 120, 120 parts which form the top seats 12, 12. The side lugs 16 of the top seats are provided by lateral extensions of the blank, as are also the side webs of the channel shaped sides 10, 10 and the lug 17 of the bottom seat 11. The blank is notched upon opposite sides as indicated by the several numerals 28, so that the bends necessary to impart the necessary V-shaped form to the blank and to provide the inwardly inclined seats at the tops of the side of the V do not require the bending, edgewise, of the side flanges (the sides of the blank being preferably turned up to provide a channel shaped structure before the V-form is imparted thereto), and the blank is recessed at 29 so as to permit the rim (supported upon the top seats 12, 12 as will be appreciated), to be swung beneath the bottom seat in placing the same upon or removing it from the carrier, as will be understood.

The arms 25, 25 are also preferably formed from suitably shaped sheet metal or thin plate blanks cut out from suitable stock and bent and shaped into proper form for attachment to the vehicle body or other support, and for supporting the triangular frame structure at their ends as hereinbefore explained; and the cross bar 13 is likewise ordinarily made from sheet or plate metal stock, and is preferably provided with a peripheral flange 30 for imparting additional stiffness thereto. This cross bar is shown as provided with an upwardly extending arm 31 for supporting a tail lamp, and with slots 32 for facilitating the attachment of a license place to said cross bar; in accordance with the usual practice of supporting the license plate and tail light from the tire carrier, and within the space enclosed by a demountable rim supported thereby.

Having thus described and explained my invention, I claim and desire to secure by Letters Patent of the United States:—

1. A tire carrier comprising a triangular frame made up of a blank having lateral extensions at its ends, which extensions are bent outwardly to form rim-receiving lugs, the blank being bent at the middle so as to leave a substantially horizontal bottom seat and two oppositely located inclined sides, the blank being also bent at the inner ends of the lateral extensions to form two oppositely located inwardly inclined top seats at the upper ends of said sides; a top bar extending between and the ends of which are secured to said top seats; and retaining means associated with said bottom seat for holding a demountable rim in place thereupon and for permitting the removal of said rim from the carrier.

2. A tire carrier comprising a frame in the form of an isosceles triangle the corners of which are flattened, the equal legs of the triangle consisting of channeled sections connected by an integral substantially horizontal bottom seat constituting one of the flattened corners, the other ends of the legs being bent inwardly to form two oppositely located inclined top seats constituting the other flattened corners, integral rim-receiving lugs projecting radially from the top seats; a top bar extending between the said top seats and connected thereto; and retaining means associated with said bottom seat for holding a demountable rim in place thereupon and for permitting the removal of said rim from the carrier.

3. A tire carrier comprising a triangular frame made up of a blank having notched portions at the middle and notched portions near each end, the material adjacent to the middle notches being bent at two places to form a substantially horizontal bottom seat and two oppositely located inclined sides, the marginal material between the middle notches and the ends being bent outward to form flanges, the blank being also bent at two places adjacent to the outer notches to form two oppositely located inwardly inclined top seats, the flanges adjacent to the said top seats constituting rim-receiving lugs; a top bar extending between and the ends of which are fastened to said top seats; and separable holding means associated with said bottom seat for removably holding a demountable rim in place upon the carrier.

4. The structure as claimed in claim 3 with the material at one side of the bottom seat bent down to form a lug.

In testimony whereof I affix my signature.

W. H. TAYLOR.